(12) United States Patent
Ushiwata et al.

(10) Patent No.: US 8,155,493 B2
(45) Date of Patent: Apr. 10, 2012

(54) FLEXIBLE OPTICAL WAVEGUIDE AND PROCESS FOR ITS PRODUCTION

(75) Inventors: Takami Ushiwata, Chiyoda-ku (JP); Koki Hirano, Chiyoda-ku (JP); Kozo Tajiri, Sanda (JP); Tomomi Makino, Ashiya (JP)

(73) Assignees: Hitachi Cable, Ltd., Tokyo (JP); Nippon Shokubai Co., Ltd, Osaka (JP)

( * ) Notice: Subject to any disclaimer, the term of this patent is extended or adjusted under 35 U.S.C. 154(b) by 206 days.

(21) Appl. No.: 12/430,302

(22) Filed: Apr. 27, 2009

(65) Prior Publication Data

US 2009/0269503 A1 Oct. 29, 2009

(30) Foreign Application Priority Data

Apr. 28, 2008 (JP) ................... 2008-117501

(51) Int. Cl.
*G02B 6/10* (2006.01)
*B32B 38/00* (2006.01)
*B05D 5/12* (2006.01)

(52) U.S. Cl. .................. 385/129; 156/250; 427/100

(58) Field of Classification Search .............. 385/14, 385/131, 143, 145, 49, 129, 146, 88, 130, 385/141, 147; 438/31; 257/E33.067; 427/100, 427/126.3, 346, 385.5, 163.2; 156/250; 528/418
See application file for complete search history.

(56) References Cited

U.S. PATENT DOCUMENTS

| | | |
|---|---|---|
| 3,379,653 A | 4/1968 | Ernst et al. |
| 3,586,616 A | 6/1971 | Kropp |
| 3,708,296 A | 1/1973 | Schlesinger |
| 4,058,400 A | 11/1977 | Crivello |

(Continued)

FOREIGN PATENT DOCUMENTS

JP 2001-15889 1/2001

(Continued)

OTHER PUBLICATIONS

W.R. Watt et al., "A Novel Photoinitiator of Cationic Polymerization: Preparation and Characterization of Bis[4-(diphenylsulfonio)phenyl]sulfide-Bis-Hexafluorophosphate", Journal of Polymer Science: Polymer Chemistry Edition, vol. 22, 1984, pp. 1789-1796.

*Primary Examiner* — Akm E Ullah

(74) *Attorney, Agent, or Firm* — Wenderoth, Lind and Ponack, L.L.P.

(57) ABSTRACT

The invention provides a flexible optical waveguide in which an optical waveguide film is directly formed on a substrate without using an adhesive and which is excellent in flexibility of the optical waveguide film, including the substrate, and excellent in adhesiveness between the substrate and the optical waveguide film, as well as a process for producing the flexible optical waveguide in a simple and easy manner. The flexible optical waveguide includes a lower cladding layer, a core layer, and an upper cladding layer successively formed on a substrate and a surface of the substrate, on which surface the lower cladding layer is to be formed, has an arithmetic average roughness (Ra) of 0.03 μm or higher. The flexible optical waveguide can be produced by subjecting a surface of the substrate, on which surface the lower cladding layer is to be formed, to physical treatment with a whetstone or chemical treatment with a corona discharge and then successively forming the lower cladding layer, the core layer, and the upper cladding layer on the surface of the substrate.

10 Claims, 3 Drawing Sheets

U.S. PATENT DOCUMENTS

| | | | |
|---|---|---|---|
| 4,068,091 A | | 1/1978 | Doi |
| 4,069,055 A | | 1/1978 | Crivello |
| 4,139,655 A | | 2/1979 | Tsao |
| 4,161,478 A | | 7/1979 | Crivello |
| 4,231,951 A | | 11/1980 | Smith et al. |
| 4,256,828 A | | 3/1981 | Smith |
| 6,088,492 A | * | 7/2000 | Kaneko et al. .................. 385/14 |
| 2004/0071424 A1 | * | 4/2004 | Hiraka et al. ................. 385/129 |
| 2005/0117847 A1 | * | 6/2005 | Ono et al. ........................ 385/49 |
| 2005/0180713 A1 | * | 8/2005 | Heideman et al. ............ 385/129 |
| 2007/0019899 A1 | * | 1/2007 | Ohtsu et al. ..................... 385/14 |
| 2007/0025672 A1 | * | 2/2007 | Suzuki et al. ................. 385/129 |
| 2008/0311694 A1 | * | 12/2008 | Kawasaki et al. ............... 438/31 |
| 2009/0223626 A1 | * | 9/2009 | Hikita ........................... 156/250 |
| 2010/0150510 A1 | * | 6/2010 | Sato et al. ..................... 385/130 |

FOREIGN PATENT DOCUMENTS

| | | |
|---|---|---|
| JP | 2002-189137 | 7/2002 |
| JP | 2004-341454 | 12/2004 |
| JP | 2006-22317 | 1/2006 |

* cited by examiner (a)

(b)

(c)

(d)

(e)

(f)

(b)

(c)

(d)

(e)

(f)

FLEXIBLE OPTICAL WAVEGUIDE AND PROCESS FOR ITS PRODUCTION

BACKGROUND OF THE INVENTION

1. Field of the Invention

The invention relates to a flexible optical waveguide and a process for its production.

2. Description of the Related Art

Along with the practical applications of optical transmission systems, techniques relevant to optical waveguides as their basic components have drawn much attention. An optical waveguide has, typically, an embedded type structure in which a core layer having a high refractive index is surrounded with a cladding layer having a low refractive index, or a ridge type structure in which a core layer having a high refractive index is formed on a lower cladding layer having a low refractive index and an upper cladding layer is an air layer. Thus, light incoming to the optical waveguide is transmitted in the core layer while being reflected at the interface between the core layer and the cladding layers or at the interface between the core layer and the air layer.

Recently, there have been developed opto-electronic hybrid integrated modules each comprising an optical waveguide and an electronic circuit disposed on a single substrate. For example, Japanese Patent Laid-open Publication (Kokai) No. 2001-15889 discloses an opto-electronic wiring board obtained by attaching an optical waveguide film to a multilayer wiring board with an adhesive. Further, Japanese Patent Laid-open Publication (Kokai) No. 2002-189137 discloses an optical wiring board obtained by attaching an optical waveguide part, which is formed on a transparent substrate, to an electronic circuit board with an adhesive. Further, Japanese Patent Laid-open Publication (Kokai) No. 2004-341454 discloses an opto-electronic hybrid integrated substrate obtained by attaching an optical waveguide film to an electronic circuit board with an adhesive.

However, such opto-electronic hybrid integrated modules, each of which is obtained by attaching an optical waveguide film to an electronic circuit board with an adhesive, have a problem that the electronic circuit board and the optical waveguide film are easily separated from each other at the time of a wet heat test. Further, in order to lead light emitted from a light emitting element mounted on an electronic circuit board to an optical waveguide, the light needs to pass through an adhesive layer, at which time light scattering is caused because of a mismatch in refractive index between the optical waveguide film and the adhesive layer, and therefore, there is a problem that the waveguide loss of the optical waveguide becomes high. Further, even if an opto-electronic hybrid integrated module has flexibility to a certain extent, in the case where an adhesive layer exists, there is also a problem that the module is weak in bending, and therefore, the electronic circuit board and the optical waveguide film are easily separated from each other at the time of a bending test.

Thus, Japanese Patent Laid-open Publication (Kokai) No. 2006-22317 discloses an opto-electronic hybrid integrated flexible module obtained by previously producing epoxy resin films to be a lower cladding layer, a core layer, and an upper cladding layer of an optical waveguide, successively vacuum laminating these epoxy resin films onto a copper-clad polyimide substrate, and then curing the resulting films for directly forming an optical waveguide film on an electron circuit board without using an adhesive.

SUMMARY OF THE INVENTION

However, in the opto-electronic hybrid integrated flexible module disclosed in Japanese Patent Laid-open Publication (Kokai) No. 2006-22317, epoxy resin films to be a lower cladding layer, a core layer, and an upper cladding layer of an optical waveguide need to be separately produced, and after these epoxy resin films are vacuum laminated onto a copper-clad polyimide substrate, the resulting film needs to be cured and a base film needs to be separated, and therefore, there is a problem that production steps become complicated and production costs becomes high.

Accordingly, it has been required to obtain a flexible optical waveguide which enables easy production of an opto-electronic hybrid integrated flexible module and which comprises an optical waveguide film formed directly on a substrate without using an adhesive or any other agent, and a process for its production in a simple and easy manner.

Under the above circumstances, an object to be solved by the present invention is to provide a flexible optical waveguide which makes it possible to directly form an optical waveguide film on a substrate without using an adhesive or any other agent and which is excellent in flexibility of the optical waveguide film, including the substrate, and adhesiveness between the substrate and the optical waveguide film; and a process for its production in a simple and easy manner.

The present inventors have made various studies, and as a result, they have found that if in a flexible optical waveguide comprising a lower cladding layer, a core layer, and an upper cladding layer successively formed on a substrate, a surface of the substrate, on which surface the lower cladding layer is to be formed, is made to have an arithmetic average roughness (Ra) of 0.03 µm or higher by subjecting the surface of the substrate to physical treatment with a whetstone or chemical treatment with a corona discharge before forming the lower cladding layer on the substrate. This finding has led to the completion of the present invention.

That is, the present invention provides a flexible optical waveguide comprising a lower cladding layer formed on a substrate, a core layer formed on the lower cladding layer, and an upper cladding layer formed on the lower cladding layer and the core layer in a manner of embedding the core layer therein, wherein a surface of the substrate, on which surface the lower cladding layer is to be formed, has an arithmetic average roughness (Ra) of 0.03 µm or higher.

In the flexible optical waveguide of the present invention, peel strength between the substrate and the lower cladding layer may preferably be 130 N/m or higher. Further, the substrate may preferably be composed of a polyimide film.

The present invention further provides a process for producing a flexible optical waveguide as described above, comprising steps of: forming a lower cladding layer on a substrate; forming a core layer on the lower cladding layer; and forming an upper cladding layer on the lower cladding layer and the core layer in a manner of embedding the core layer therein, wherein a surface of the substrate, on which surface the lower cladding layer is to be formed, is subjected to physical treatment with a whetstone or chemical treatment with a corona discharge before the step of forming the lower cladding layer on the substrate.

In the process for producing a flexible optical waveguide according to the present invention, the lower cladding layer may preferably be formed by coating an UV-curable epoxy resin on the substrate and carrying out ultraviolet irradiation to cure the epoxy resin. Further, the substrate may preferably be composed of a polyimide film.

With respect to the flexible optical waveguide of the present invention, a surface of a substrate, on which surface a lower cladding layer is to be formed, has an arithmetic average roughness (Ra) of 0.03 µm or higher by subjecting the surface of the substrate to physical treatment with a whetstone or chemical treatment with a corona discharge, and therefore, peel strength between the substrate and the lower cladding layer is high, for example, even if the flexible optical waveguide is continuously bent 100,000 times or more at ±90 degrees with a radius of 2 mm at room temperature, neither separation nor rupture occurs. This is because even if fine cracks are formed at the time of bending the flexible optical waveguide, the cracks thus formed do not spread largely due to high adhesiveness between the substrate and the lower cladding layer. Further, if a polyimide film is used as the substrate, because the polyimide film is excellent in flexibility and heat resistance, an opto-electronic hybrid integrated flexible module can be produced from the flexible optical waveguide.

In the process for producing a flexible optical waveguide according to the present invention, there is no need to include a step of forming an adhesive layer or any other layer between a substrate and a lower cladding layer, but there is only a need to include steps of subjecting a surface of the substrate, on which surface the lower cladding layer is to be formed, to physical treatment with a whetstone or chemical treatment with a corona discharge and then successively forming a lower cladding layer, a core layer, and an upper cladding layer on the surface of the substrate, and therefore, an optical waveguide film can be formed on the substrate in a simple and easy manner and production costs can remarkably be saved.

DETAILED DESCRIPTION OF THE PREFERRED EMBODIMENTS

Flexible Optical Waveguide

The flexible optical waveguide of the present invention comprises a lower cladding layer formed on a substrate, a core layer formed on the lower cladding layer, and an upper cladding layer formed on the lower cladding layer and the core layer in a manner of embedding the core layer therein, wherein a surface of the substrate, on which surface the lower cladding layer is to be formed, has an arithmetic average roughness (Ra) of 0.03 µm or higher.

In the flexible optical waveguide of the present invention, an optical waveguide film is formed on a substrate. That is, a resin film constituting a lower cladding layer, a resin film constituting a core layer, and a resin film constituting an upper cladding layer are successively formed on the substrate. In addition, if necessary, the flexible optical waveguide of the invention may comprise, for example, a protection film, a release film, or any other film on the upper side of the upper cladding layer.

Figure 1:
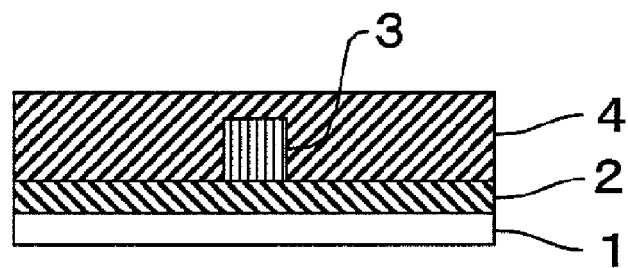
FIG. 1 is a cross sectional view schematically showing the structure of a typical example of the flexible optical waveguide of the invention.

A typical example of the flexible optical waveguide of the present invention is shown in FIG. 1. The flexible optical waveguide of the present invention is not limited to this typical example, and its structure and composition may appropriately be modified or varied. As shown in FIG. 1, first, a lower cladding layer 2 is formed on a substrate 1. The lower cladding layer 2 is directly adhered onto the substrate 1 without forming an adhesive layer or any other layer interposed therebetween. A surface of the substrate 1, on which surface the lower cladding layer 2 is to be formed, has previously been subjected to physical treatment with a whetstone or chemical treatment with a corona discharge, and therefore, the surface of the substrate 1 has an arithmetic average roughness (Ra) of 0.03 µm or higher. A core layer 3 is formed on the lower cladding layer 2.

Then, an upper cladding layer 4 is formed on the lower cladding layer 2 and the core layer 3 in a manner of embedding the core layer 3 therein. The core layer 3 and the upper cladding layer 4 are directly adhered onto the lower cladding layer 2 without forming an adhesive layer or any other layer interposed therebetween. The substrate 1, the lower cladding layer 2, the core layer 3, and the upper cladding layer 4 are composed of various resin films. In FIG. 1, only one core layer 3 is formed; however, two or more core layers may be formed according to the applications of a flexible optical waveguide and other factors. Further, although the core layer 3 is formed in the form of a line extending along the vertical direction to the paper of the drawing, it may be formed into a prescribed pattern according to the applications of a flexible optical waveguide and other factors.

Figure 2:
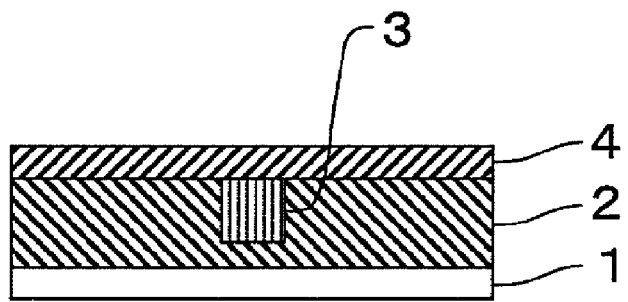
FIG. 2 is a cross sectional view schematically showing a structure of another typical example of the flexible optical waveguide of the invention.

Another typical example of the flexible optical waveguide of the present invention is shown in FIG. 2. The flexible optical waveguide of the present invention is not limited to this typical example, and its structure and composition may appropriately be modified or varied. As shown in FIG. 2, first, a lower cladding layer 2 with a groove for a core layer is formed on a substrate 1. The lower cladding layer 2 is directly adhered onto the substrate 1 without forming an adhesive layer or any other layer interposed therebetween. A surface of the substrate 1, on which surface the lower cladding layer 2 is to be formed, has previously been subjected to physical treatment with a whetstone or chemical treatment with a corona discharge, and therefore, the surface of the substrate 1 has an arithmetic average roughness (Ra) of 0.03 µm or higher. A core layer 3 is formed in the groove for a core layer formed in the lower cladding layer 2.

Then, an upper cladding layer 4 is formed on the lower cladding layer 2 and the core layer 3 in a manner of embedding the core layer 3 therein. The upper cladding layer 4 is directly adhered onto the lower cladding layer 2 and the core layer 3 without forming an adhesive layer or any other layer interposed therebetween. The substrate 1, the lower cladding layer 2, the core layer 3, and the upper cladding layer 4 are composed of various resin films. In FIG. 2, only one core layer 3 is formed; however, two or more core layers may be formed according to the applications of a flexible optical waveguide and other factors. Further, although the core layer 3 is formed in the form of a line extending along the vertical direction to the paper of the drawing, it may be formed into a prescribed pattern according to the applications of a flexible optical waveguide and other factors.

<Substrate>

In the flexible optical waveguide of the present invention, a resin film constituting a substrate is not particularly limited so long as it has flexibility. Specifically, there can be used films composed of any of the heretofore known materials for optical waveguides, such as epoxy type resins, polyimide type resins, acrylic type resins, polyester type resins, polystyrene type resins, cycloolefin type resins, polyether sulfone type resins, polyether ketone type resins, polyether nitrile type resins, oxetane type resins, silane type resins, and silicone type resins. In these resin films, taking into consideration the production of an opto-electronic hybrid integrated flexible module, films composed of polyimide type resins, i.e., polyimide films (including halogenated polyimide films) may be preferred from the viewpoint of heat resistance (in particular, heat resistance assuming soldering; specifically, heat resistance to temperatures of from 200° C. to 250° C.).

In the case where a resin film constituting a substrate is a polyimide film, the polyimide film is formed by coating a polyamide acid composition as a substrate material to a base material such as a silicon substrate or quartz glass and then curing the composition by heat treatment or reduced pressure drying. The polyamide acid composition can be prepared by mixing therein a polyamide acid obtained by the reaction of a diamine compound and a tetracarboxylic acid in an organic solvent. In addition, in order to lower the specific permittivity of a polyimide film, a fluorine-containing alkoxysilane may be contained in the polyamide acid composition. Further, in order to adjust the refractive index of a polyimide film, a metal oxide precursor, a catalyst for reaction to produce a metal oxide from the precursor, and/or a coupling agent having a reactive group may be contained in the polyamide acid composition. If such a polyamide acid composition is used, a polyimide film which is excellent in flexibility and heat resistance can be obtained. The polyimide film exhibits particularly excellent performance when it is used as a substrate for flexible optical waveguides.

Alternatively, as a polyimide film constituting a substrate, commercially available products may also be employed. Examples of the commercially available products of polyimide films may include a series of product name: Kapton (registered trade name), available from DuPont-Toray Co., Ltd.

In the case where a resin film constituting a substrate is a polyimide film, the substrate composed of the polyimide film is excellent in heat resistance, and therefore, an opto-electronic hybrid integrated flexible module can be produced from a flexible optical waveguide. In this case, in place of an ordinary polyimide film, a polyimide film with an electric wiring may be used for producing a flexible optical waveguide, and a portion on which a light emitting device and/or a light receiving device is to be mounted may be cut into a V-shape by a dicing saw to form a 45 degree mirror.

The thickness of a resin film constituting a substrate may appropriately be selected according to the applications of a flexible optical waveguide, the wavelength of light to be used in the case where an opto-electronic hybrid integrated flexible module is produced from the flexible optical waveguide, and other factors, and therefore, it is not particularly limited. Specifically, it may preferably be not smaller than 5 μm, more preferably not smaller than 10 μm, and it may preferably be not greater than 100 μm, more preferably not greater than 50 μm. If the thickness of a resin film constituting a substrate is too small, the strength of the substrate may be decreased. In contrast, if the thickness of a resin film constituting a substrate is too great, the flexibility of a flexible optical waveguide may be lowered, and in the case where an opto-electronic hybrid integrated flexible module is produced, the optical transparency of the substrate may be lowered.

In the flexible optical waveguide of the present invention, a surface of a substrate, on which surface a lower cladding layer is to be formed, has been subjected to physical treatment with a whetstone or chemical treatment with a corona discharge, and the surface of the substrate has an arithmetic average roughness (Ra) of 0.03 μm or higher. Because a surface of a substrate, on which surface a lower cladding layer is to be formed, has an arithmetic average roughness (Ra) of 0.03 μm or higher, adhesiveness between the substrate and the lower cladding layer is improved, and therefore, peel strength is increased, so that for example, even if a flexible optical waveguide is continuously bent 100,000 times or more at ±90 degrees with a radius of 2 mm at room temperature, it can attain a remarkable effect such that neither separation nor rupture occurs.

A surface of a substrate, on which surface a lower cladding layer is to be formed, has an arithmetic average roughness (Ra) of 0.03 μm or higher, which may preferably be not lower than 0.04 μm, more preferably not lower than 0.05 μm, and which may preferably be not higher than 0.5 μm, more preferably not higher than 0.3 μm, and still more preferably not lower higher than 0.2 μm. If a surface of a substrate, on which surface a lower cladding layer is to be formed, has a too low arithmetic average roughness (Ra), adhesiveness between the substrate and the lower cladding layer may be lowered, and therefore, peel strength may be lowered, so that when a flexible optical waveguide is bent, either separation or rupture may occur. In contrast, if a surface of a substrate, on which surface a lower cladding layer is to be formed, has a too high arithmetic average roughness (Ra), for example, in the case where an opto-electronic hybrid integrated flexible module is produced, light passing between the substrate and the lower cladding layer may be scattered, and therefore, transmission loss may become high. The "arithmetic average roughness (Ra)" as used herein is defined in JIS B0601: 2001 and is a value measured using, for example, a probe type surface shape measurement apparatus (product name: Dektak (registered trade name) 6M, available from ULVAC Equipment Sales, Inc.).

The peel strength between the substrate and the lower cladding layer may preferably be 130 N/m or higher, more preferably 140 N/m or higher, and still more preferably 150 N/m or higher. If the peel strength between the substrate and the lower cladding layer is too low, at the time of bending a flexible optical waveguide, either separation or rupture may occur. Further, the peel strength between the substrate and the lower cladding layer may preferably be 1,000 N/m or lower, more preferably 800 N/m or lower, and still more preferably 500 N/m or lower. The "peel strength" as used herein is a value measured using, for example, a tensile tester (product name: EZ-test-100N, available from Shimadzu Corporation) according to JIS K6894 8.6.3.

The physical treatment with a whetstone may be carried out using any of the heretofore known whetstones, and therefore it is not particularly limited; however, in order to allow a surface of a substrate, on which surface a lower cladding layer is to be formed, to have an arithmetic average roughness (Ra) of 0.03 μm or higher, preferably not higher than 0.5 μm, it needs to use a whetstone of preferably not lower than #1000, more preferably not lower than #2000, and still more preferably not lower than #3000, and of preferably not higher than #10000, more preferably not higher than #9000, and still more preferably not higher than #8000. These whetstones may be used alone, or two or more of these whetstones may also be used in combination. If the count of a whetstone is too small, the grain size of the whetstone is coarse and the unevenness of a surface of a resin film constituting a substrate may become significant, so that for example, in the case where an opto-electronic hybrid integrated flexible module is produced, light passing between the substrate and the lower cladding layer may be scattered, and therefore, transmission loss may become high. In contrast, if the count of a whetstones is too high, the grain size of the whetstone is fine, and therefore, the unevenness of a surface of a resin film constituting a substrate may become slight and adhesiveness between the substrate and the lower cladding layer may be decreased, and therefore, peel strength may be lowered, so that when a flexible optical waveguide is bent, either separation or rupture may occur.

The shape of a whetstone is not particularly limited so long as it is suitable for forming unevenness on a surface of a resin film constituting a substrate. Examples thereof may include whetstones obtained by forming abrasive materials into rectangular forms, whetstones obtained by depositing abrasive materials to the surfaces of rectangular supports, whetstones obtained by forming abrasive materials into column, cylinder, or disk shapes, whetstones obtained by depositing abrasive materials to outer circumferential end faces of column-, cylinder-, or disk-shaped supports, and whetstones obtained by depositing abrasive materials to one or both surfaces of sheet-shaped base materials.

A method of physical treatment with a whetstone is not particularly limited so long as it can form unevenness on a surface of a resin film constituting a substrate. Specifically, for example, a rectangular or sheet-shaped whetstone is brought into contact with a surface of a resin film constituting a substrate and the whetstone is slid; or the outer circumferential end face of a column-, cylinder-, or disk-shaped whetstone is brought into contact with a surface of a resin film constituting a substrate and the resin film is slid. From the viewpoint of production efficiency, it is preferable to form unevenness on a surface of a resin film as a substrate by bringing the outer circumferential end face of a column-, cylinder-, or disk-shaped whetstone into contact with the surface of the resin film while continuously drawing out a roll-shaped resin film and allowing the resin film to run.

The chemical treatment with a corona discharge may be carried out using any of the heretofore known corona discharge apparatuses, and therefore, it is not particularly limited. The corona discharge apparatuses are those for carrying out surface treatment of a base material by generating a corona discharge in the air using a high-frequency high voltage and irradiating the resultant air ions and high speed electrons to a surface of the base material.

A method of chemical treatment with a corona discharge is not particularly limited so long as it can achieve surface treatment of a resin film constituting a substrate. Specifically, for example, using any of the heretofore known corona discharge apparatuses, a corona discharge is generated by putting a resin film constituting a substrate on a ground electrode and applying a high-frequency high voltage between the ground electrode and a discharge electrode facing the resin film. From the viewpoint of production efficiency, it is preferable to carry out surface treatment of a resin film as a substrate by applying a high-frequency high voltage between a roll-shaped ground electrode and a discharge electrode facing the resin film on the roll-shaped ground electrode to generate a corona discharge while continuously drawing out a roll-shaped resin film, allowing the resin film to run, and moving the resin film along the outer circumferential end face of the roll-shaped ground electrode.

<Optical Waveguide Film>

In the flexible optical waveguide of the present invention, an optical waveguide film is formed on a substrate. That is, a resin film constituting a lower cladding layer, a resin film constituting a core layer, and a resin film constituting an upper cladding layer are successively formed on the substrate.

The resin films, which constitute the lower cladding layer, the core layer, and the upper cladding layer, are not particularly limited so long as the resin films have flexibility and adhesiveness to the adjacent resin films. There can be used materials for optical waveguides, which are composed of the heretofore known thermoplastic resins, heat-curable resins, or UV-curable resins. Specifically, there can be used resin films composed of the heretofore known materials for optical waveguides, including heat-curable resins and UV-curable resins, such as epoxy type resins, polyimide type resins, silane type resins, silicone type resins, and oxetane type resins; or thermoplastic resins such as acrylic type resins, polystyrene type resins, cycloolefin type resins, polyether sulfone type resins, polyether ketone type resins, and polyether nitrile type resins. In these resin films, from the viewpoint of workability during production, heat-curable resins and UV-curable resins may be preferred. In particular, from the viewpoint of adhesiveness, films composed of epoxy type resins (e.g., UV-curable epoxy resins and heat-curable epoxy resins), i.e., epoxy type resin films may be preferred.

<UV-Curable Epoxy Resin>

In the epoxy type resins, UV-curable epoxy resins containing a polyglycidyl compound having a polyalkylene glycol chain(s) and at least two glycidyl groups may particularly be preferred.

Specific examples of the polyglycidyl compound having a polyalkylene glycol chain(s) and at least two glycidyl groups may include diglycidyl ethers of polyether polyols such as polyethylene ether glycol, polypropylene ether glycol, polytetramethylene ether glycol, and polypentamethylene ether glycol; diglycidyl ethers of copolyether polyols such as copoly(tetramethylene-2-methylbutylene) ether diol, and copoly(tetramethylene-2,3-dimethylbutylene) ether diol; and triglycidyl ethers of aliphatic polyols such as trimethylolpropane triglycidyl ether.

In order to adjust the refractive index and viscosity of an UV-curable resin, if necessary, a bisphenol type epoxy resin(s) and/or an alicyclic epoxy resin(s) may be contained in the UV-curable epoxy resin. However, epoxy resins with lower viscosities are more excellent in handling property, and therefore, they may be preferred. The amounts of bisphenol type epoxy resin and/or alicyclic epoxy resin to be contained may appropriately be adjusted so that an epoxy type resin film obtained from an UV-curable epoxy resin has a desired refractive index and/or may appropriately be adjusted so that an UV-curable epoxy resin has a desired viscosity, and therefore, they are not particularly limited; however, each of them may preferably be 10,000 parts by mass or smaller, more preferably 5,000 parts by mass or smaller, and still more preferably 1,000 parts by mass or smaller, relative to 100 parts by mass of a polyglycidyl compound having a polyalkylene glycol chain(s) and at least two glycidyl groups.

In order to cure an UV-curable epoxy resin, a photo-cationic polymerization initiator(s) is contained in the UV-curable epoxy resin. Examples of the photo-cationic polymerization initiator may include metal-fluoroboron complex salts and boron trifluoride complex compounds as described in U.S. Pat. No. 3,379,653; bis(perfluoroalkylsulfonyl)methane metal salts as described in U.S. Pat. No. 3,586,616; aryl diazonium compounds as described in U.S. Pat. No. 3,708,296; aromatic onium salts of group VIa elements as described in U.S. Pat. No. 4,058,400; aromatic onium salts of group Va elements as described in U.S. Pat. No. 4,069,055; dicarbonyl chelates of from group IIIa to Va elements as described in U.S. Pat. No. 4,068,091; thiopyrylium salts as described in U.S. Pat. No. 4,139,655; group VIb elements in form of $MF_6^-$ anions (wherein M is selected from phosphorus, antimony, and arsenic) as described in U.S. Pat. No. 4,161,478; arylsulfonium complex salts as described in U.S. Pat. No. 4,231,951; aromatic iodonium complex salts and aromatic sulfonium complex salts as described in U.S. Pat. No. 4,256,828; bis[4-(diphenylsulfonio)phenyl]sulfide-bis-hexafluorometal salts (e.g., phosphates, arsenates, antimonates) as described by W. R. Watt et al. in the Journal of Polymer Science, Polymer Chemistry, vol. 22, p. 1789 (1984); mixed ligand metal salts of iron compounds; and silanol-aluminum complexes. These photo-cationic polymerization initiators may be used alone, or two or more of these photo-cationic polymerization initiators may also be used in combination. In these photo-cationic polymerization initiators, arylsulfonium complexes, aromatic iodonium complexes or aromatic sulfonium complexes of halogen-containing complex ions, and aromatic onium salts of group II, V, and VI elements may be preferred. Some of these salts are obtained as commercially available products such as UVI-6976 and UVI-6992 (available from The Dow Chemical Company); FX-512 (available from 3M Company); UVR-6990 and UVR-6974 (available from Union Carbide Corporation); UVE-1014 and UVE-1016 (available from General Electric Company); KI-85 (available from Degussa Aktiengesellschaft), SP-150 and SP-170 (available from by ADEKA Corporation); and San-Aid (registered trade name) SI-60L, SI-80L, SI-100L, SI-110L, and SI-180L (available from Sanshin Chemical Industry Co., Ltd.).

The amount of photo-cationic polymerization initiator to be contained may appropriately be adjusted according to the amounts of epoxy resin components to be cured, and therefore, it is not particularly limited; however, it may preferably be not smaller than 0.1 parts by mass, more preferably not smaller than 0.5 parts by mass, and still more preferably not smaller than 1 part by mass, and it may preferably be not greater than 10 parts by mass, more preferably not greater than 8 parts by mass, and still more preferably not greater than 5 parts by mass, relative to 100 parts by mass as the total amounts of epoxy resin components.

The UV-curable epoxy resin can be adjusted so as to have a viscosity in a range of from 10 to 100,000 mPa·s at a temperature of 23° C. without using a solvent by appropriately selecting the molecular weight of a polyglycidyl compound having a polyalkylene glycol chain(s) and at least two glycidyl groups as a raw material as well as the molecular weight(s) of a bisphenol type epoxy resin and/or an alicyclic epoxy resin to be contained, if necessary.

Because an UV-curable epoxy resin is in a liquid state at normal temperature, a cured epoxy type resin film constituting a lower cladding layer can be obtained by coating an appropriate amount of UV-curable epoxy resin on a substrate subjected to physical treatment with a whetstone or chemical treatment with a corona discharge and then carrying out ultraviolet irradiation to cure the epoxy resin.

Alternatively, a cured epoxy type resin film constituting a lower cladding layer with a groove for a core layer can be obtained by putting a convex mold having a convex portion corresponding to the groove for a core layer on a substrate subjected to physical treatment with a whetstone or chemical treatment with a corona discharge while using a spacer interposed between the substrate and the convex mold, casting an appropriate amount of UV-curable epoxy resin into the space formed between the substrate and the convex mold, and then carrying out ultraviolet irradiation to cure the epoxy resin.

Alternatively, a cured epoxy type resin film constituting a lower cladding layer having a groove for a core layer can be obtained by coating an appropriate amount of UV-curable epoxy resin on a substrate subjected to physical treatment with a whetstone or chemical treatment with a corona discharge, putting a convex mold having a convex portion corresponding to the groove for a core layer on the substrate, and then carrying out ultraviolet irradiation to cure the epoxy resin.

Further, a cured epoxy type resin film constituting a core layer can be obtained by coating an appropriate amount of UV-curable epoxy resin on the lower cladding layer and then carrying out ultraviolet irradiation to cure the epoxy resin.

Alternatively, a cured epoxy type resin film constituting a core layer can be obtained by casting an appropriate amount of UV-curable epoxy resin into the groove for a core layer formed in the lower cladding layer and then carrying out ultraviolet irradiation to cure the epoxy resin.

Further, a cured epoxy type resin film constituting an upper cladding layer can be obtained by coating an appropriate amount of UV-curable epoxy resin on the lower cladding layer, including the core layer and then carrying out ultraviolet irradiation to cure the epoxy resin.

The integrated illumination intensity (i.e., exposure energy) of ultraviolet rays for curing an UV-curable epoxy resin is not particularly limited; however, it may preferably be from 0.01 to 10 J/cm$^2$.

<Lower Cladding Layer>

In the flexible optical waveguide of the invention, a lower cladding layer is formed on the surface of a substrate, which surface has been subjected to physical treatment with a whetstone or chemical treatment with a corona discharge.

In the case where a resin film constituting a lower cladding layer is an epoxy type resin film, the epoxy type resin film is formed using an epoxy resin (e.g., an UV-curable epoxy resin or a heat-curable epoxy resin) as a cladding material. The epoxy type resin film constituting the lower cladding layer may preferably be formed by coating a cladding material on a substrate subjected to physical treatment with a whetstone or chemical treatment with a corona discharge and then carrying out ultraviolet irradiation or heat treatment to cure the cladding material; alternatively, putting a convex mold having a convex portion corresponding to a groove for a core layer on a substrate subjected to physical treatment with a whetstone or chemical treatment with a corona discharge while using a spacer interposed between the substrate and the convex mold, casting a cladding material into the space formed between the substrate and the convex mold, and then carrying out ultraviolet irradiation to cure the cladding material; or alternatively, coating a cladding material on a substrate subjected to physical treatment with a whetstone or chemical treatment with a corona discharge, putting a convex mold having a convex portion corresponding to the groove for a core layer, and then carrying out ultraviolet irradiation to cure the cladding material.

In the case where a resin film constituting a lower cladding layer is a thermoplastic resin film, the thermoplastic resin film is formed using a coating solution containing the thermoplastic resin, as a cladding material. The thermoplastic resin film constituting the lower cladding layer may preferably be formed by coating a cladding material on a substrate subjected to physical treatment with a whetstone or chemical treatment with a corona discharge, and then if necessary, carrying out drying treatment, to form a film; alternatively, coating a heated cladding material on a substrate subjected to physical treatment with a whetstone or chemical treatment with a corona discharge, then cooling the cladding material, and then if necessary, carrying out drying treatment, to form a film; alternatively, putting a convex mold having a convex portion corresponding to a groove for a core layer on a substrate subjected to physical treatment with a whetstone or chemical treatment with a corona discharge while using a spacer interposed between the substrate and the convex mold, casting a cladding material into the space formed between the substrate and the convex mold, and then if necessary, carrying out drying treatment, to form a film; or alternatively, coating a cladding material on a substrate subjected to physical treatment with a whetstone or chemical treatment with a corona discharge, putting a convex mold having a convex portion corresponding to the groove for a core layer and heated to a softening temperature of the thermoplastic resin or higher, and then if necessary, carrying out drying treatment, to form a film.

The thickness of a resin film constituting a lower cladding layer (it means the thickness of a portion excluding the lower portion of a core layer in the case where the core layer is formed in the lower cladding layer) may appropriately be selected according to the applications of a flexible optical waveguide, the wavelength of light to be used, and other factors, and therefore, it is not particularly limited. Specifically, it may preferably be not smaller than 5 µm, more preferably not smaller than 10 µm, and it may preferably be not greater than 1,000 µm, more preferably 500 µm, and still more preferably 100 µm. If the thickness of a resin film constituting a lower cladding layer is too small, the strength of a flexible optical waveguide may be decreased. In contrast, if the thickness of a resin film constituting a lower cladding layer is too great, the flexibility of a flexible optical waveguide may be lowered. A resin film constituting a lower cladding layer may have a multilayer structure consisting of two or more layers in order to satisfy both of adhesiveness of the lower cladding layer to a substrate and strength of an optical waveguide film.

The refractive index of a resin film constituting a lower cladding layer is not particularly limited so long as it is lower than the refractive index of a resin film constituting a core layer. Specifically, it can arbitrarily be adjusted in a range of from 1.45 to 1.65 by selecting, for example, the type and composition of an epoxy type resin.

<Core Layer>

In the flexible optical waveguide of the present invention, a lower cladding layer is formed on a substrate and a core layer is formed on the lower cladding layer.

In the case where a resin film constituting a core layer is an epoxy type resin film, the epoxy type resin film is formed using an epoxy type resin (e.g., an UV-curable epoxy resin or a heat-curable epoxy resin) as a core material. The epoxy type resin film constituting the core layer may preferably be formed by coating a core material on the lower cladding layer, then putting a mask on the lower cladding layer, carrying out ultraviolet irradiation to cure the core material, and removing uncured portions; alternatively, coating a core material on the lower cladding layer, carrying out ultraviolet irradiation or heat treatment to cure the core material, then forming a patterned resist layer thereon, and removing uncovered portions; or alternatively, casting the core material into a groove for a core layer formed in the lower cladding layer and then carrying out ultraviolet irradiation to cure the core material.

In the case where a resin film constituting a core layer is a thermoplastic resin film, the thermoplastic resin film is formed using a coating solution containing a thermoplastic resin, as a core material. The thermoplastic resin film constituting the core layer may preferably be formed by coating a core material on the lower cladding layer, then if necessary, carrying out drying treatment, to form a film, then forming a patterned resist layer thereon, and removing uncovered portions; alternatively, coating a core material, if necessary, heated, on the lower cladding layer, cooling the core material, then if necessary, carrying out drying treatment, to form a film, and then forming a patterned resist layer thereon, and removing uncovered portions; alternatively, casting a core material into the groove for a core layer formed in the lower cladding layer, and then if necessary, carrying out drying treatment, to form a film; or alternatively, casting a heated core material into the groove for a core layer formed in the lower cladding layer, cooling the core material, and then if necessary, carrying out drying treatment, to form a film.

The thickness of a resin film constituting a core layer may appropriately be selected according to the applications of a flexible optical waveguide, the wavelength of light to be used, and other factors, and therefore, it is not particularly limited. Specifically, it may preferably be not smaller than 5 µm, and it may preferably be not greater than 1,000 µm, more preferably not greater than 500 µm, and still more preferably not greater than 100 µm. If the thickness of a resin film constituting a core layer is too small, the amount of light to be transmitted in the core layer may be decreased. In contrast, if the thickness of a resin film constituting a core layer is too great, the flexibility of a flexible optical waveguide may be lowered.

The refractive index of a resin film constituting a core layer is not particularly limited so long as it is higher than the refractive index of a resin film constituting a lower cladding layer and the refractive index of a resin film constituting an upper cladding layer. Specifically, it can arbitrarily be adjusted in a range of from 1.45 to 1.65 by selecting, for example, the type and composition of an epoxy type resin.

In addition, the number of core layer to be embedded in the upper cladding layer may appropriately be set according to the applications of a flexible optical waveguide and other factors, and therefore, it is not particularly limited; however, it may be one layer or more. Further, the core layer may be formed into a prescribed pattern according to the applications of a flexible optical waveguide and other factors.

<Upper Cladding Layer>

In the flexible optical waveguide of the present invention, a lower cladding layer is formed on a substrate, a core layer is formed on the lower cladding layer, and an upper cladding layer is formed on the lower cladding layer, including the core layer.

In the case where a resin film constituting an upper cladding layer is an epoxy type resin film, the epoxy type resin film is formed using an epoxy type resin (e.g., an UV-curable epoxy resin or a heat-curable epoxy resin) as a cladding material. In the case where both of a lower cladding layer and an upper cladding layer are composed of epoxy type resin films, an identical epoxy type resin may preferably be used as a cladding material. The epoxy type resin film constituting the upper cladding layer may preferably be formed by coating a cladding material on the lower cladding layer, including the core layer, and then carrying out ultraviolet irradiation or heat treatment to cure the cladding material.

In the case where a resin film constituting an upper cladding layer is a thermoplastic resin film, the thermoplastic resin film is formed using a coating solution containing a thermoplastic resin, as a cladding material. The thermoplastic resin film constituting the upper cladding layer may preferably be formed by coating a cladding material on the lower cladding layer, including the core layer, and then if necessary, carrying out drying treatment, to form a film; or alternatively, coating a cladding material, if necessary, heated, on the lower cladding layer, including the core layer, then if necessary, cooling the cladding material, and then if necessary, carrying out drying treatment, to form a film.

The thickness of a resin film constituting an upper cladding layer (it means the thickness of a portion excluding the upper part of a core layer in the case where the core layer is formed in the upper cladding layer) may appropriately be selected according to the applications of a flexible optical waveguide, the wavelength of light to be used, and other factors, and therefore, it is not particularly limited. Specifically, it may preferably be not smaller than 5 µm, more preferably not smaller than 10 μm, and it may preferably be not greater than 1,000 μm, more preferably not greater than 500 μm, and still more preferably not greater than 100 μm. If the thickness of a resin film constituting an upper cladding layer is too small, it may become impossible to form a core layer having a sufficient thickness. In contrast, if the thickness of a resin film constituting an upper cladding layer is too great, the flexibility of a flexible optical waveguide may be lowered.

The refractive index of a resin film constituting an upper cladding layer is not particularly limited so long as it is lower than the refractive index of a resin film constituting a core layer. Specifically, it can arbitrarily be adjusted in a range of from 1.45 to 1.65 by selecting, for example, the type and composition of an epoxy type resin.

<Process for Producing Flexible Optical Waveguide>

The process for producing a flexible optical waveguide according to the present invention comprises steps of forming a lower cladding layer on a substrate, forming a core layer on the lower cladding layer, and forming an upper cladding layer on the lower cladding layer, including the core layer, wherein a surface of the substrate, on which surface the lower cladding layer is to be formed, is subjected to physical treatment with a whetstone or chemical treatment with a corona discharge before the step of forming the lower cladding layer on the substrate.

In the process for producing a flexible optical waveguide according to the present invention, the lower cladding layer may preferably be formed by coating an UV-curable epoxy resin on the substrate and then curing the epoxy resin by carrying out ultraviolet radiation. Further, the substrate may preferably be composed of a polyimide film.

A substrate may be formed by any of the heretofore known methods or any of the commercially available resin films may be used as a substrate, and therefore, it is not particularly limited. A method of forming a substrate may be, for example, a method of coating a substrate material on a base material by any of the heretofore known coating techniques such as spin coating technique, bar coater technique, roll coater technique, gravure coater technique, and knife coater technique, and then carrying out treatment such as ultraviolet irradiation or heat treatment to cure the substrate material.

Methods of forming a lower cladding layer, a core layer, and an upper cladding layer may be employed from the heretofore known methods, and therefore, they are not particularly limited.

For example, in the case of a lower cladding layer, there may be mentioned methods of subjecting a surface of a substrate, on which the lower cladding is to be formed, to physical treatment with a whetstone or chemical treatment with a corona discharge, then coating a cladding material on the surface of the substrate by any of the heretofore known coating methods such as spin coating techniques, bar coater technique, roll coater technique, gravure coater techniques, and knife coater technique, and then carrying out treatment such as ultraviolet irradiation or heat treatment to cure the cladding material, or if necessary, carrying out cooling or drying treatment, to form a film.

In the case of a core layer, there may be mentioned methods of coating a cladding material on the lower cladding layer by any of the heretofore known coating techniques such as spin coating technique, bar coater technique, roll coater technique, gravure coater technique, and knife coater technique, and then carrying out treatment such as ultraviolet irradiation or heat treatment to cure the core material, or if necessary, carrying out cooling or drying treatment, to form a film.

In the case of an upper cladding layer, there may be mentioned methods of coating a cladding material on the lower cladding layer, including the core layer, by any of the heretofore known coating techniques such as spin coating technique, bar coater technique, roll coater technique, gravure coater technique, and knife coater technique, and then carrying out treatment such as ultraviolet irradiation or heat treatment to cure the cladding material, or if necessary, carrying out cooling or drying treatment, to form a film.

Additionally, in the case of a core layer, it is required that a core material (e.g., an UV-curable epoxy resin) is coated on a lower cladding layer, followed by carrying out ultraviolet irradiation to cure the core material while placing a mask thereon, and then removing uncured portions; or alternatively, a core material (e.g., an UV-curable epoxy resin, a heat-curable epoxy resin, a coating solution containing a thermoplastic resin) is coated on a lower cladding layer, followed by carrying out ultraviolet irradiation or heat treatment to cure the core material, or if necessary, carrying out cooling or drying treatment of the core material, to form a film, then forming a patterned resist layer thereon, and removing uncoated portions. Further, as methods of forming a core layer, besides the above methods, there can also be used methods such as relief printing, engraved printing, mold forming methods, dispenser methods, and inkjet methods.

Further, production may be started from a resin film constituting a substrate, and a surface of the resin film may be subjected to physical treatment with a whetstone or chemical treatment with a corona discharge, and then a lower cladding layer, a core layer, and an upper cladding layer may successively be formed on the surface of the resin film. In this case, from the viewpoint of production efficiency, it is preferable to subject a surface of the resin film to physical treatment with a whetstone or chemical treatment with a corona discharge while continuously drawing out a roll-shaped resin film constituting a substrate and allowing the resin film to run, and then successively form a lower cladding layer, a core layer, and an upper cladding layer on the surface of the resin film.

Figure 3:
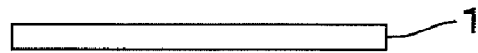
FIG. 3 is a step drawing schematically showing a typical example of the process for producing the flexible optical waveguide shown in FIG. 1.
Figure 3:
Figure 3:
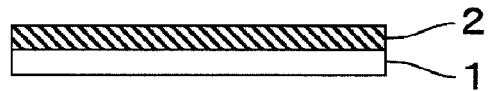
Figure 3:
Figure 3:
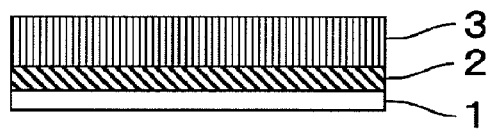
Figure 3:
Figure 3:
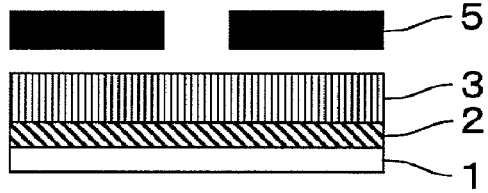
Figure 3:
Figure 3:
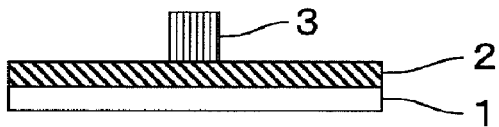
Figure 3:
Figure 3:
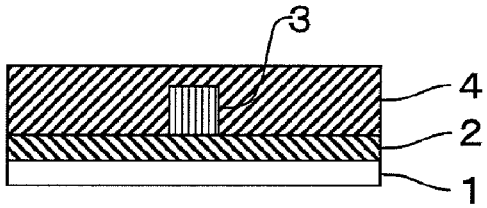
Figure 4:
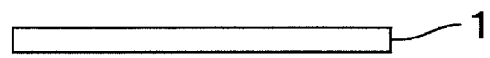
FIG. 4 is a step drawing schematically showing another example of the process for producing the flexible optical waveguide shown in FIG. 1.
Figure 4:
Figure 4:
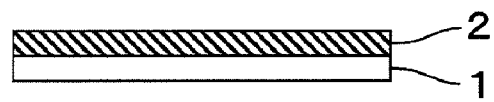
Figure 4:
Figure 4:
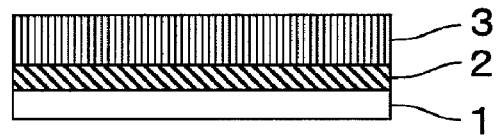
Figure 4:
Figure 4:
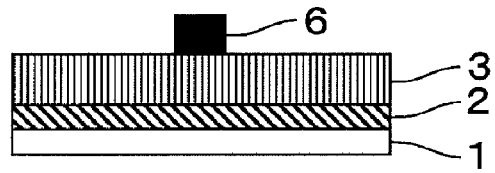
Figure 4:
Figure 4:
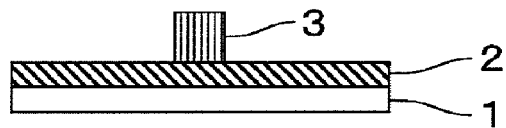
Figure 4:
Figure 4:
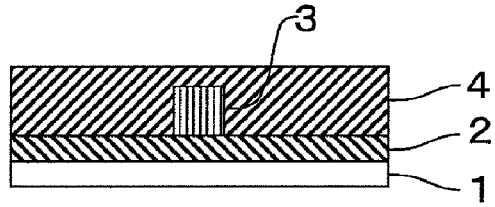

Referring to FIGS. 3 and 4, typical examples of the process for producing a flexible optical waveguide according to the present invention will be described below in detail; however, the production process of the present invention is not limited to the following typical examples and may be carried out with appropriate modifications or variations. FIGS. 3 and 4 show the cases where a substrate is composed of a polyimide film and each of a lower cladding layer, a core layer, and an upper cladding layer is composed of an epoxy type resin film. In FIGS. 3 and 4, reference numerals 1 to 4 have the same meanings as those in FIGS. 1 and 2, and reference numerals 5 and 6 are a photomask and a resist layer, respectively. In FIGS. 3(f) and 4(f), although only one core layer 3 is formed, two or more core layers may be formed according to the applications of a flexible optical waveguide and other factors. Further, although the core layer 3 is formed in the form of a line extending along the vertical direction to the papers of the drawings, it may be formed into a prescribed pattern according to the applications of a flexible optical waveguide and other factors.

First, an amide acid composition as a substrate material is dropped on a base material (not shown) such as a silicon substrate or quartz glass to form a film by spin coating technique or any other coating technique, and this coated film is subjected to heat treatment or reduced pressure drying to form a substrate 1 composed of a polyimide film, or a substrate 1 composed of a commercially available polyimide film is used. Then, as shown in FIG. 3(a), a surface of the substrate 1, on which surface a lower cladding layer 2 is to be formed, is subjected to physical treatment with a whetstone or chemical treatment with a corona discharge to form unevenness (not shown) thereon. The surface of the substrate 1 has an arithmetic average roughness (Ra) of 0.03 μm or higher.

Then, as shown in FIG. 3(b), an epoxy type resin as a cladding material is dropped on the substrate 1 to form a film by spin coating technique or any other coating technique, and this coated film is subjected to ultraviolet irradiation or heat treatment to form the lower cladding layer 2 composed of an epoxy type resin film.

Further, as shown in FIG. 3(c), an epoxy type resin as a core material is dropped on the lower cladding layer 2 to form a film by spin coating technique or any other coating technique to form a core layer 3, and as shown in FIG. 3(d), a photomask 5 is put on the core layer 3, followed by carrying out ultraviolet radiation, and uncured portions are washed away with an appropriate solvent to form a patterned core layer 3 as shown in FIG. 3(e).

Then, as shown in FIG. 3(f), an epoxy type resin as a clad material is dropped on the core layer 3 and the portions of the lower cladding layer 2, which portions are not covered with the core layer 3, to form a film by spin coating technique or any other technique, and this coated film is subjected to ultraviolet irradiation or heat treatment to form an upper cladding layer 4 composed of an epoxy type resin film.

Finally, if necessary, an optical waveguide film, including the substrate 1, is separated from the base material (not shown) to obtain a flexible optical waveguide in which the substrate 1 is composed of the polyimide film, and the lower cladding layer 2, the core layer 3, and the upper cladding layer 4 are composed of the epoxy type resin films.

Alternatively, first, a polyamide acid composition as a substrate material is dropped on a base material (not shown) such as a silicon substrate or quartz glass to form a film by spin coating technique or any other coating technique, and this coated film is subjected to heat treatment or reduced pressure drying to form a substrate 1 composed of a polyimide film, or a substrate 1 composed of a commercially available polyimide film is used. Then, as shown in FIG. 4(a), a surface of the substrate 1, on which surface a lower cladding layer 2 is to be formed, is subjected to physical treatment with a whetstone or chemical treatment with a corona discharge to form unevenness (not shown) thereon. The surface of the substrate 1 has an arithmetic average roughness (Ra) of 0.03 μm or higher.

Then, as shown in FIG. 4(b), an epoxy type resin as a clad material is dropped on the substrate 1 to form a film by spin coating technique or any other coating technique, and this coated film is subjected to ultraviolet irradiation or heat treatment to form a lower cladding layer 2 composed of an epoxy type resin film.

Further, as shown in FIG. 4(c), an epoxy type resin as a core material is dropped on the lower cladding layer 2 to form a film by spin coating technique or any other coating technique, and this coated film is subjected to ultraviolet irradiation or heat treatment to form a core layer 3 composed of an epoxy type resin film. Further, as shown in FIG. 4(d), a photoresist is coated on the core layer 3, followed by pre-baking, exposing, developing, and after-baking, to form a patterned resist layer 6. Successively, as shown in FIG. 4(e), after the portions of the core layer 3, which portions are not covered with the resist layer 6, are removed by dry etching, the resist layer 6 is separated to form a patterned core layer 3 on the lower cladding layer 2.

Then, as shown in FIG. 4(f), an epoxy type resin as a clad material is dropped on the core layer 3 and the portions of the lower cladding layer 2, which portions are not covered with the core layer 3, to form a film by spin coating technique, and this coated film is subjected to ultraviolet irradiation or heat treatment to form an upper cladding layer 4 composed of an epoxy type resin film.

Finally, if necessary, an optical waveguide film, including the substrate 1, is separated from the base material (not shown) to obtain a flexible optical waveguide in which the substrate 1 is composed of the polyimide film, and the lower cladding layer 2, the core layer 3, and the upper cladding layer 4 are composed of the epoxy type resin films.

The process for producing a flexible optical waveguide according to the present invention is not limited to sheet-fed processes for producing flexible optical waveguides one by one in the production method as described above, and the following continuous process to continuously obtain flexible optical waveguides may be employed: that is, the continuous process comprises previously producing a roll of a polyimide film constituting a substrate using a polyamide acid composition, or previously preparing a roll of a commercially available polyimide film, and while drawing out the polyimide film from the roll, subjecting a surface of the substrate, on which a lower cladding layer is to be formed, to physical treatment with a whetstone or chemical treatment with a corona discharge, and then, successively forming a lower cladding layer, a core layer and an upper cladding layer on the surface of the substrate.

The process for producing a flexible optical waveguide according to the present invention usually employs a method of producing a flexible optical waveguide film by subjecting a surface of a substrate, on which surface a lower cladding layer is to be formed, to physical treatment with a whetstone or chemical treatment with a corona discharge, and then successively forming a lower cladding layer, a core layer, and an upper cladding layer on the surface of the substrate to produce an optical waveguide film, without attaching a previously produced optical waveguide film to the substrate with an adhesive or vacuum laminating previously produced epoxy resin films on the substrate as in the conventional techniques. If such a method is employed, particularly, because there is no need for a step of forming an adhesive layer between the substrate and the lower cladding layer, and in addition to this, because the lower cladding layer, the core layer, and the upper cladding layer are successively formed on the substrate, an optical waveguide film can be formed on the substrate in a simple and easy manner, and therefore, production costs can remarkably be saved.

EXAMPLES

The present invention will be described below in more detail by way of Examples, but the present invention is not limited to the following Examples. The present invention can be put into practice after appropriate modifications or variations within a range meeting the gists described above and later, all of which are included in the technical scope of the present invention. In the following examples and comparative example, the degree of unevenness formed on a surface of a substrate, which surface has been subjected to physical treatment with a whetstone or chemical treatment with a corona discharge, is expressed by the arithmetic average roughness (Ra).

First, the following will describe a method of measuring the arithmetic average roughness (Ra) of a surface of a substrate, which surface has been subjected to physical treatment with a whetstone or chemical treatment with a corona discharge, and a method of measuring the waveguide loss of a flexible optical waveguide.

<<Method of Measuring Arithmetic Average Roughness (Ra)>>

The arithmetic average roughness (Ra) of a surface of a substrate, which surface had been subjected to physical treatment with a whetstone or chemical treatment with a corona discharge was measured using a probe type surface shape measurement apparatus (product name: Dektak (registered trade name) 6M, available from ULVAC Equipment Sales, Inc.). The measurement apparatus employs a method as defined in JIS B0601: 2001.

<<Method of Measuring Waveguide Loss>>

Each of the flexible optical waveguides obtained was provided with a light input port and a light output port by cutting its end faces using a dicing saw (product name: DAD 321, available from DISCO Corporation) so that the length of an optical waveguide became 5 cm. A quartz optical fiber having a core diameter of 50 µm was connected to a light emitting diode having a wavelength of 850 nm and the other fiber end was set to be an input fiber end. On the other hand, a quartz optical fiber having a core diameter of 50 µm was connected to a light power meter (product name: MT9810A, available from Anritsu Corporation) and the other fiber end was set to be an output fiber end. The input fiber end was allowed to come face to face with the output fiber end, and then, positioning was carried out in such a manner that the intensity of the light power meter (product name: MT9810A, available from Anritsu Corporation) became the maximum light intensity by an automatic fiber alignment apparatus (available from Suruga Seiki Co., Ltd.), and the light intensity at that time was set to be Ref (dBm). Successively, the input fiber end of one optical fiber and the output fiber end of the other optical fiber were allowed to come face to face with the respective end faces of the optical waveguide, and positioning of the respective optical fibers was carried out in such a manner that the intensity of the light power meter (product name: MT9810A, available from Anritsu Corporation) became the maximum light intensity by an automatic fiber alignment apparatus (available from Suruga Seiki Co., Ltd.), and the light intensity at that time was set to be Obs (dBm). The insertion loss INT (dB) of the 5 cm optical waveguide was calculated by the formula: Ref (dBm)–Obs (dBm). Successively, the optical waveguide was cut at 1 cm inner side from one of the end faces using a dicing saw (product name: DAD 321, available from DISCO Corporation) to obtain an optical waveguide having a length of 4 cm and in the same manner as described above, the insertion loss INT (dB) of the 4 cm optical waveguide was calculated. In the same manner, the optical waveguide was cut one by one centimeter until the length of the optical waveguide became 1 cm, and the insertion loss INT (dB) calculation was repeated. The respective data were plotted while setting the length (cm) of the optical waveguide in the horizontal axis and the insertion loss INT (dB) in the vertical axis, and the waveguide loss (dB/cm) of the optical waveguide was obtained from the inclination of the resultant straight line. This method is referred to usually as a cut-back method.

Then, the following will describe preparations of UV-curable epoxy resins used as a cladding material and a core material when flexible optical waveguides were produced.

<<Preparation of UV-Curable Epoxy Resin (1)>>

An UV-curable epoxy resin (1) used as a cladding material was prepared by mixing 64 parts by mass of a diglycidyl ether of polytetramethylene ether glycol (product name: jER (registered trade name) YL7410, available from Japan Epoxy Resin Co., Ltd.; the number average molecular weight thereof was from 700 to 800; the epoxy equivalent thereof was 420), 32 parts by mass of a bisphenol A type epoxy resin (product name: jER (registered trade name) 828 EL, available from Japan Epoxy Resin Co., Ltd.; the epoxy equivalent thereof was from 184 to 194), and 4 parts by mass of triarylsulfonium hexafluorophosphoric acid salt (product name: UVI-6992, available from the Dow Chemical Company) by the use of a rotation and revolution type centrifugal mixing apparatus (product name: AWATORI RENTARO (registered trade name), available from THINKY CORPORATION).

The viscosity of the UV-curable epoxy resin composition (1) was measured at a temperature of 23° C. using a rheometer (product name: RC 20-CPS, Rheotec Co., Ltd.) and found to be 180 mPa·s. Further, the refractive index of the epoxy resin composition (1) after curing was measured at a wavelength of 850 nm using a prism coupler (product name: SPA-4000, available from SAIRON TECHNOLOGY, INC.) and found to be 1.50.

<<Preparation of UV-Curable Epoxy Resin (2)>>

An UV-curable epoxy resin (2) used as a core material was prepared by mixing 9 parts by mass of a diglycidyl ether of polytetramethylene ether glycol (product name: jER (registered trade name) YL7410, available from Japan Epoxy Resin Co., Ltd.; the number average molecular weight thereof was from 700 to 800; the epoxy equivalent thereof was 420), 45 parts by mass of a bisphenol A type epoxy resin (product name: jER (registered trade name) 828 EL, available from Japan Epoxy Resin Co., Ltd.; the epoxy equivalent thereof was from 184 to 194), 45 parts by mass of a brominated bisphenol A type epoxy resin (product name: jER (registered trade name) 5050, available from Japan Epoxy Resin Co., Ltd.; the epoxy equivalent thereof was from 380 to 410), and 1 part by mass of triarylsulfonium hexafluorophosphoric acid salt (product name: UVI-6992, available from the Dow Chemical Company) by the use of a rotation and revolution type centrifugal mixing apparatus (product name: AWATORI RENTARO (registered trade name), available from THINKY CORPORATION).

The viscosity of the UV-curable epoxy resin composition (2) was measured at a temperature of 23° C. using a rheometer (product name: RC 20-CPS, Rheotec Co., Ltd.) and found to be 83,680 mPa·s. Further, the refractive index of the epoxy resin composition (2) after curing was measured at a wavelength of 850 nm using a prism coupler (product name: SPA-4000, available from SAIRON TECHNOLOGY, INC.) and found to be 1.58.

Then, the following will describe Examples and Comparative Example in which flexible optical waveguides were actually produced.

<<Production of Flexible Optical Waveguides>>

Example 1

A polyimide film with a 8-µm thick copper circuit (product name: Kapton (registered trade name) H type, available from DuPont-Toray Co., Ltd.; the thickness thereof was 25 µm) was used as a substrate, and a surface of the substrate, which surface was reverse to the copper circuit, was subjected to physical treatment with a #3000 whetstone to form unevenness (the arithmetic average roughness (Ra) thereof was 0.08 µm) thereon.

The UV-curable epoxy resin (1) was coated as a cladding material on the surface of the substrate by spin coating technique and cured by carrying out ultraviolet irradiation at an illumination intensity of 10 mW/cm$^2$ for 15 minutes, i.e., at an exposure energy of 9 J/cm$^2$, by the use of an exposure apparatus (product name: MA-60F, available from Mikasa Co., Ltd.) with a high pressure mercury lamp as a light source to form a lower cladding layer composed of an epoxy type resin film having a thickness of 25 μm.

At this stage, peel strength between the substrate and the lower cladding layer was measured using a tensile tester (product name: EZ-test-100N, available from Shimadzu Corporation) according to JIS K6894 8.6.3 and found to be 300 N/m, and it showed excellent adhesiveness.

In the same manner as described above, a lower cladding layer was formed on the substrate, and the UV-curable epoxy resin (2) was coated as a core material on the resultant lower cladding layer by spin coating technique and cured by carrying out ultraviolet irradiation through a photomask at an illumination intensity of 10 mW/cm$^2$ for 15 minutes, i.e., at an exposure energy of 9 J/cm$^2$, by the use of an exposure apparatus (product name: MA-60F, available from Mikasa Co., Ltd.) with a high pressure mercury lamp as a light source for patterning, followed by washing away uncured portions with acetone, to form a core layer composed of an epoxy type resin film having a thickness of 50 μm and a width of 50 μm.

Further, the UV-curable epoxy resin (1) was coated as a cladding material on the lower cladding layer, including the resultant core layer, by spin coating technique and cured by carrying out ultraviolet irradiation at an illumination intensity of 10 mW/cm$^2$ for 15 minutes, i.e., at an exposure energy of 9 J/cm$^2$, by the use of an exposure apparatus (product name: MA-60F, available from Mikasa Co., Ltd.) with a high pressure mercury lamp as a light source to form an upper cladding layer composed of an epoxy type resin film having a thickness of 70 μm (the thickness of the upper cladding layer on the core layer was 20 μm).

Thus, a flexible optical waveguide having the lower cladding layer, the core layer, and the upper cladding layer, all of which were composed of epoxy type resin films, on the substrate of the polyimide film was obtained.

When the waveguide loss of the resultant flexible optical waveguide was measured, it was 0.15 dB/cm. Further, even if a flexible optical waveguide obtained in the same manner as described above was continuously bent 100,000 times at +90 degrees with a radius of 2 mm at room temperature according to the method as defined in JPCA-PE02-05-01S-2005 7.1.2b, neither separation nor rupture occurred and it showed excellent appearance. When the waveguide loss of the resultant flexible optical waveguide was measured after the 100,000 times bending, it was 0.16 dB/cm.

Example 2

A flexible optical waveguide having a lower cladding layer, a core layer, and an upper cladding layer, all of which were composed of epoxy type resin films, on a substrate of a polyimide film was obtained in the same manner as described in Example 1, except that the #3000 whetstone was changed to a #6000 whetstone to form unevenness (the arithmetic average roughness (Ra) thereof was 0.06 μm) on a surface of the substrate, which surface was reverse to the copper circuit.

At the stage where the lower cladding layer was formed on the substrate, peel strength between the substrate and the lower cladding layer was measured using a tensile tester (product name: EZ-test-100N, available from Shimadzu Corporation) according to JIS K6894 8.6.3 and found to be 170 N/m, and it showed excellent adhesiveness.

When the waveguide loss of a flexible optical waveguide obtained in the same manner as described above was measured, it was 0.15 dB/cm. Further, even if a flexible optical waveguide obtained in the same manner as described above was continuously bent 100,000 times at ±90 degrees with a radius of 2 mm at room temperature according to the method as defined in JPCA-PE02-05-01S-2005 7.1.2b, neither separation nor rupture occurred and it showed excellent appearance. When the waveguide loss of the resultant flexible optical waveguide was measured after the 100,000 times bending, it was 0.19 dB/cm.

Example 3

A flexible optical waveguide having a lower cladding layer, a core layer, and an upper cladding layer, all of which were composed of epoxy type resin films, on a substrate composed of a polyimide film was obtained in the same manner as in Example 1, except that the #3000 whetstone was changed to a #8000 whetstone to form unevenness (the arithmetic average roughness (Ra) thereof was 0.05 μm) on a surface of the substrate, which surface was reverse to the copper circuit.

At the stage where the lower cladding layer was formed on the substrate, peel strength between the substrate and the lower cladding layer was measured using a tensile tester (product name: EZ-test-100N, available from Shimadzu Corporation) according to JIS K6894 8.6.3 and found to be 140 N/m, and it showed excellent adhesiveness.

When the waveguide loss of a flexible optical waveguide obtained in the same manner as described above was measured in the same manner, it was 0.15 dB/cm. Furthermore, even if a flexible optical waveguide obtained in the same manner as described above was continuously bent 100,000 times at ±90 degrees with a radius of 2 mm at room temperature according to the method as defined in JPCA-PE02-05-01S-2005 7.1.2b, neither separation nor rupture occurred and it showed excellent appearance. When the waveguide loss of the obtained flexible optical waveguide was measured after the 100,000 times bending, it was 0.20 dB/cm.

Example 4

A flexible optical waveguide having a lower cladding layer, a core layer, and an upper cladding layer, all of which were composed of epoxy type resin films, on a substrate composed of a polyimide film was obtained in the same manner as in Example 1, except that a surface of the substrate, which surface was reverse to the copper circuit, was subjected to chemical treatment with a corona discharge in place of the physical treatment with a whetstone.

At the stage where the lower cladding layer was formed on the substrate, peel strength between the substrate and the lower cladding layer was measured using a tensile tester (product name: EZ-test-100N, available from Shimadzu Corporation) according to JIS K6894 8.6.3 and found to be 175 N/m, and it showed excellent adhesiveness.

When the waveguide loss of a flexible optical waveguide obtained in the same manner as described above was measured, it was 0.15 dB/cm. Further, even if a flexible optical waveguide obtained in the same manner as described above was continuously bent 100,000 times at 90 degrees with a radius of 2 mm at room temperature according to the method as defined in JPCA-PE02-05-01S-2005 7.1.2b, neither separation nor rupture occurred and it showed excellent appearance. When the waveguide loss of the obtained flexible optical waveguide was measured after the 100,000 times bending, it was 0.19 dB/cm.

Comparative Example 1

A flexible optical waveguide having a lower cladding layer, a core layer, and an upper cladding layer, all of which were composed of epoxy type resin films, on a substrate composed of a polyimide film was obtained in the same manner as in Example 1, except that a surface of the substrate, which surface was reverse to the copper circuit, was subjected to neither physical treatment with a whetstone nor chemical treatment with a corona discharge, and therefore, the arithmetic average roughness (Ra) of the surface of the substrate was lower than 0.03 μm.

At the stage where the lower cladding layer was formed on the substrate, peel strength between the substrate and the lower cladding layer was measured using a tensile tester (product name: EZ-test-100N, available from Shimadzu Corporation) according to JIS K6894 8.6.3 and found to be 120 N/m, and it showed poor adhesiveness.

When the waveguide loss of a flexible optical waveguide obtained in the same manner as described above was measured, it was 0.15 dB/cm. Further, when a flexible optical waveguide obtained in the same manner as described above was continuously bent 100,000 times at ±90 degrees with a radius of 2 mm at room temperature according to the method as defined in JPCA-PE02-05-01S-2005 7.1.2b, an optical waveguide film was separated from the substrate and ruptured.

<<Evaluation>>

As described above, with respect to the flexible optical waveguides of Examples 1 to 4, the surface of the substrate, on which surface the lower cladding layer was to be formed, was subjected to physical treatment with a whetstone or chemical treatment with a corona discharge and the surface of the substrate had an arithmetic average roughness values (Ra) of not lower than 0.03 μm, and therefore, the peel strength between the substrate and the lower cladding layer was as high as not lower than 130 N/m and adhesiveness was excellent in all these flexible optical waveguides. Further, these flexible optical waveguides were all excellent in flexibility and durable to bending, and therefore, they were able to be continuously bent 100,000 times at ±90 degrees with a radius of 2 mm at room temperature. Further, the waveguide loss measured after forming waveguide end faces was sufficiently low and the waveguide loss measured even after the 100,000 times bending was not so much increased, and therefore, these flexible optical waveguides were practically usable flexible optical waveguides.

On the other hand, with respect to the flexible optical waveguide of Comparative Example 1, the surface of the substrate, on which surface the lower cladding layer was to be formed, was subjected to neither physical treatment with a whetstone nor chemical treatment with a corona discharge and the surface of the substrate had an arithmetic average roughness (Ra) of lower than 0.03 μm, and therefore, peel strength between the substrate and the lower cladding layer was low, adhesiveness was poor, and flexibility was also poor. Further, this flexible optical waveguide was weak to bending, and therefore, when this flexible optical waveguide was continuously bent 100,000 times at ±90 degrees with a radius of 2 mm radius at room temperature, an optical waveguide film was separated from the substrate and ruptured.

Thus, it can be understood that with respect to flexible optical waveguides each having a lower cladding layer, a core layer, and an upper cladding layer, all of which are successively formed on a substrate, if a surface of the substrate, on which surface the lower cladding layer is to be formed, is subjected to physical treatment with a whetstone or chemical treatment with a corona discharge before the step of forming the lower cladding layer so that the surface of the substrate has an arithmetic average roughness (Ra) of 0.03 μm or higher, it makes possible to obtain practically usable flexible optical waveguides which are excellent in flexibility of an optical waveguide film, including the substrate, as well as excellent in adhesiveness between the substrate and the optical waveguide film, and durable to bending, and which can continuously be bent 100,000 times at ±90 degrees with a radius of 2 mm radius at room temperature. Further, a process for producing a flexible optical waveguide has no need to include a step of forming an adhesive layer or any other layer between a substrate and a lower cladding layer, but has only a need to include steps of subjecting a surface of the substrate, on which surface the lower cladding layer is to be formed, to physical treatment with a whetstone or chemical treatment with a corona discharge and then successively forming a lower cladding layer, a core layer, and an upper cladding layer on the surface of the substrate, and therefore, flexible optical waveguides can be produced in a simple and easy manner.

The flexible optical waveguide of the present invention can be used, similarly to ordinary optical waveguides, for various optical waveguide apparatuses. Further, with respect to the flexible optical waveguide of the present invention, when opto-electronic hybrid integrated flexible modules are produced from the flexible optical waveguide of the present invention, the opto-electronic hybrid integrated flexible modules can be used for various electronic equipments. The flexible optical waveguide of the present invention is excellent in flexibility of an optical waveguide film, including a substrate, as well as excellent in adhesiveness between the substrate and the optical waveguide film, and therefore, the opto-electronic hybrid integrated flexible modules can preferably be used for parts (e.g., hinge parts) required to be flexible in electronic equipments such as mobile phones, digital cameras, digital video cameras, domestic and portable game machines, notebook type personal computers, and high speed printers. Further, the flexible optical waveguide of the present invention can also be used for optical interconnection. The process for producing a flexible optical waveguide according to the present invention makes it possible to produce such a flexible optical waveguide in a simple and easy manner, and therefore, production costs can remarkably be saved. Accordingly, the present invention makes a great contribution to various optics related fields and electronic equipment fields, in which the applications of flexible optical waveguides are highly expected.

The invention claimed is:

1. A flexible optical waveguide comprising a resin substrate;
   a lower cladding layer formed on the resin substrate;
   a core layer formed on the lower cladding layer and
   an upper cladding layer formed on the lower cladding layer and the core layer such that the core layer is embedded in the upper cladding layer,
   wherein a surface of the resin substrate, on which surface the lower cladding layer is formed, has an arithmetic average roughness (Ra) of 0.03 μm or higher,
   and wherein at least one layer of the core layer, the lower cladding layer and the upper cladding layer is formed of an epoxy type resin.

2. The flexible optical waveguide according to claim 1, wherein peel strength between the resin substrate and the lower cladding layer is 130 N/m or higher.

3. The flexible optical waveguide according to claim 1, wherein the resin substrate comprises a polyimide film.

4. A process for producing the flexible optical waveguide according to claim 1, the process comprising:
   forming a lower cladding layer on a resin substrate;
   forming a core layer on the lower cladding layer;

forming an upper cladding layer on the lower cladding layer and the core layer such that the core layer is embedded in the upper cladding layer: and before the forming of the lower cladding layer on the resin substrate, subjecting a surface of the resin substrate, on which surface the lower cladding layer is to be formed, to physical treatment with a whetstone or chemical treatment with a corona discharge.

5. The process according to claim 4, wherein the forming of the lower cladding layer comprises coating a UV-curable epoxy resin on the resin substrate and carrying out ultraviolet irradiation to cure the epoxy resin.

6. The process according to claim 4, wherein the resin substrate comprises a polyimide film.

7. The flexible optical waveguide according to claim 1, wherein the arithmetic average roughness (Ra) is not greater than 0.2 μm.

8. The flexible optical waveguide according to claim 1, wherein the epoxy type resin contains an organic bond in a main chain thereof.

9. The flexible optical waveguide according to claim 1, wherein the epoxy type resin contains a glycol chain as a main chain thereof.

10. The flexible optical waveguide according to claim 1, wherein the epoxy type resin contains a polyglycidyl compound having a polyalkylene glycol chain and at least two glycidyl groups.

* * * * *